UNITED STATES PATENT OFFICE.

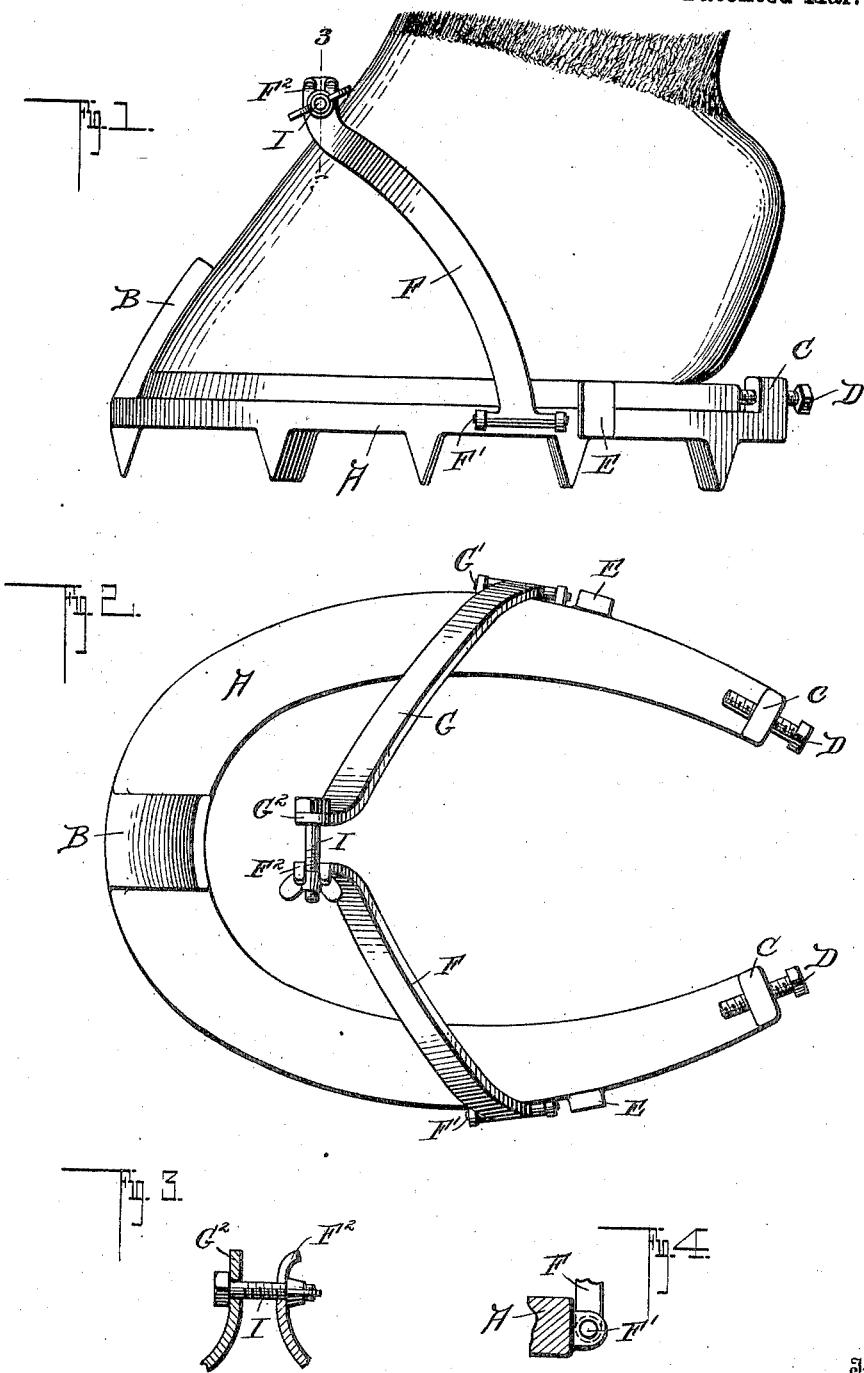

ROBERT JOSEPH KLEISER, OF NASHVILLE, TENNESSEE.

SAFETY ATTACHMENT FOR HORSESHOES.

951,534. Specification of Letters Patent. Patented Mar. 8, 1910.

Application filed April 26, 1909. Serial No. 492,213.

*To all whom it may concern:*

Be it known that I, ROBERT JOSEPH KLEISER, a citizen of the United States, residing at Nashville, in the county of Davidson and State of Tennessee, have invented a new and useful Improvement in Safety Attachments for Horseshoes, of which the following is a specification.

This invention relates to safety attachments for horseshoes and more particularly to overshoes, the object being to provide a shoe which can be easily and quickly attached to the ordinary horseshoe on an animal so as to prevent the animal from slipping in bad weather.

A further object of my invention is to provide an overshoe which is provided with very novel means for securing the same to the horseshoe, whereby all danger of the overshoe becoming detached in use is prevented.

A still further object of the invention is to provide an overshoe which is provided with calks and one which is provided with hinged straps adapted to be secured together at their free ends over the hoof of the animal.

With these objects in view, my invention consists in the novel features of construction hereinafter fully described, pointed out in the claims and shown in the accompanying drawings, in which:

Figure 1 is a side elevation of my improved overshoe, showing it in position on the foot of an animal. Fig. 2 is a top plan view of the overshoe. Fig. 3 is a section taken on the line 3—3 of Fig. 1, and Fig. 4 is a detail view showing the manner of connecting the straps to the shoe.

In carrying out my improved invention, I employ a metal shoe A similar in shape to the ordinary shoe now in use having a toe piece B and heel pieces C which are provided with horizontally threaded bores in which are mounted thumb screws D adapted to engage a shoe of an animal when placed thereon, the toe piece B fitting up over the hoof and it will be seen that by tightening the screws D the shoe will be locked thereon. The overshoe A is provided with side lugs E which extend upwardly a sufficient distance to prevent the shoe of the animal from moving sidewise within the overshoe, and it will be seen that after the overshoe is placed in position, it will be held therein in such a manner that it is almost impossible for the same to become detached. The overshoe is also provided with additional fastening means which comprises two metal straps F and G which are provided with eyes at their lower ends through which extend pivot pins F', G' which are mounted in apertured lugs extending outwardly from the sides of the overshoe A and it will be seen that by this arrangement the straps F and G are pivotally connected to the shoe A so as to allow the same to move outwardly in order that the shoe can be placed over the foot of the animal. The straps F and G are slightly curved forwardly as clearly shown and are provided with angled ends $F^2$, $G^2$. The angled end of the strap G is provided with an opening through which extends a bolt I provided with a nut, said bolt being provided with a head adapted to fit in a slot formed in the angled end of the strap F and it will be seen that when the straps are swung into position over the hoof of the animal and the bolt I is placed in the slot of the strap F and when the nut is tightened, the straps will be brought together so as to clamp the same. By this arrangement the shoe is fastened so that if the thumb screws D should become accidentally loose, the shoe would be still held in position.

From the foregoing description, it will be seen that I have provided an overshoe which is so constructed that it can be attached to the hoof of an animal having the ordinary shoes thereon, and which when attached will form a shoe which will prevent the animal from slipping and by this arrangement it is not necessary to have the horse rough shod as the overshoes can be quickly attached in bad weather.

Having thus fully described my invention, what I claim as new and desire to secure by Letters Patent, is:—

1. A shoe of the kind described comprising a body adapted to fit over the ordinary horseshoe now in use, said body having a toe piece and heel pieces, said heel pieces being provided with threaded bores in which are mounted thumb screws, side lugs formed on the body extending upwardly to each side, apertured spaced lugs extending outwardly from the sides of the body carrying pivot pins, straps provided with eyes mounted on said pivot pins, said straps being provided with angled free ends, one of said straps being provided with an opening and the other with a slot, and a bolt mounted within the opening of said strap provided with a head adapted to fit within the slot of the other strap.

2. As a new article of manufacture, an overshoe comprising a body similar in shape to the ordinary horseshoe now in use, said body having a toe piece and heel pieces, thumb screws mounted in the heel pieces, lugs extending upwardly from the sides of the body adjacent the heel pieces, apertured lugs extending outwardly from the sides of the body in advance of the upwardly projecting lugs, straps pivotally mounted between said apertured lugs, said straps having angled free ends, one of said straps having an opening and the other a slot, and a bolt mounted within the opening having a head adapted to fit within said slot, said bolt carrying a nut for drawing said ends together.

3. A horseshoe comprising a body having a curved toe piece and upwardly projecting heel pieces, said heel pieces having horizontally threaded bores, thumb screws mounted in said threaded bores, lugs extending upwardly from said body adjacent said heel pieces, spaced laterally projecting lugs formed on the body in advance of the upwardly projecting lugs, metal straps pivotally mounted between said spaced lugs having angled free ends, said straps being slightly curved, and a bolt carried by one strap adapted to fit within a slot formed in the other strap for locking said straps together.

ROBERT JOSEPH KLEISER.

Witnesses:
W. P. CLEMENTS,
C. T. COOK.